United States Patent [19]

Komatsu et al.

[11] Patent Number: 5,340,658
[45] Date of Patent: Aug. 23, 1994

[54] COMPOSITES MADE OF CARBON-BASED AND METALLIC MATERIALS

[75] Inventors: Tadao Komatsu, Akashi; Seiichiro Miyata, Shimonoseki, both of Japan

[73] Assignee: Ishihara Chemical Co., Ltd., Kobe, Japan

[21] Appl. No.: 928,751

[22] Filed: Aug. 13, 1992

[30] Foreign Application Priority Data

Aug. 21, 1991 [JP] Japan ................... 3-235418
Sep. 2, 1991 [JP] Japan ................... 3-248300

[51] Int. Cl.⁵ ............................... B22F 5/00
[52] U.S. Cl. ................... 428/558; 219/75; 428/546; 428/553
[58] Field of Search ............. 75/208 R, 239; 148/127; 164/51; 219/75, 117.1; 228/124, 194; 280/281.1; 376/136; 420/473; 427/37; 428/117, 225, 621, 558, 546, 553

[56] References Cited

U.S. PATENT DOCUMENTS

| | | | |
|---|---|---|---|
| 4,194,107 | 3/1980 | Klasson | 219/75 |
| 4,402,744 | 9/1983 | Sara | 75/239 |
| 4,587,097 | 5/1986 | Rabinkin et al. | 420/473 |
| 4,764,435 | 8/1988 | Hosizaki et al. | 428/621 |
| 4,861,392 | 8/1989 | Grabe | 148/23 |
| 5,054,682 | 10/1991 | Mistry | 228/194 |
| 5,161,728 | 11/1992 | Li | 228/124 |

FOREIGN PATENT DOCUMENTS

62-161466 1/1986 Japan.
62-219599 3/1987 Japan.

OTHER PUBLICATIONS

JPO 63-219599 abstract only Mar. 1987.
JPO 62-161466 abstract only Jan. 1986.

*Primary Examiner*—Donald P. Walsh
*Assistant Examiner*—John N. Greaves
*Attorney, Agent, or Firm*—Armstrong, Westerman, Hattori, McLeland & Naughton

[57] ABSTRACT

The invention provides composites made from a carbon-based material and a meallic material by joining them together by means of a brazing filler metal which is an alloy comprising, as essential components thereof, at least one element selected from among vanadium, niobium, titanium, zirconium and silicon and at least one element selected from among copper, silver, nickel and aluminum as well as welding nozzles made by joining a ring made of a carbon-based material to the tip of a metal nozzle using said brazing filler metal.

3 Claims, No Drawings

COMPOSITES MADE OF CARBON-BASED AND METALLIC MATERIALS

TECHNICAL FIELD

The present invention relates to composites and welding nozzles made of a carbon-based material and a metallic material.

BACKGROUND ART

Carbon-based materials, although they are fragile and have poor oxidation resistance, have some outstanding characteristics. For example they hardly get wet with molten metals and, by virtue of such characteristics, they are used as parts of metal melting equipment or as members of welding equipment.

Generally, these parts or members are manufactured by cutting and shaping a large block or by integrating carbon-made parts with shaped metallic bodies by mechanical jointing means, such as screwing or caulking.

However, when wholly made of carbon, they become expensive and, in addition, are fragile and break easily in many instances during use, whereas those made by mechanical integration with metallic bodies are disadvantageous in that screws, caulkings or the like may readily become loosened and allow parts to fall off.

In surmounting these drawbacks, it is effective to restrict the use of carbon to those portions in which its use is indispensable or, in other words, make main bodies of metallic materials, followed by metallurgical bonding of both. For this, however, it is necessary to solve the following problems.

(1) Problem of thermal stress on joints

Essentially, carbon and metals are extremely different in coefficient of expansion. Therefore, great thermal stress may readily be exerted on joints, causing destruction thereof.

(2) Problem of thermal fatigue

Carbon-metal composites are generally used maximally at an ambient temperature of 450° C. Thus they are subjected to repeated heating from ordinary temperature to 450° C. and, because of the resulting fatigue, they cannot be used for a long period of time.

Any composite made of a carbon-based material and a metallic material with which such problems can be solved has not been available as yet. Improvements in heat resistance and thermal fatigue resistance are earnestly desired.

Meanwhile, the welding nozzles so far used in arc welding, such as carbon dioxide gas welding, TIG welding or MIG welding, are, for example, torch nozzles made from copper, copper alloys, aluminum, aluminum alloys or the like, or modifications thereof plated with chromium, chromium alloys or the like, or surface-treated (cf. e.g. Japanese Patent Publication No. 56-10982 and Japanese Unexamined (Kokai) Patent Publication No. 55-10350). However, these, as such, cannot prevent spatter adhesion, hence they are generally used with an antispatter coating applied to their surface. However, such means disadvantageously involve complicated operations for spatter removal or antispatter agent application, for instance.

In view of such problems, attempts have so far been made to use, as welding nozzle materials, carbon-based materials that are excellent materials from the viewpoint of preventing spatter adhesion during welding. Thus the known methods include, among others, the one comprising forming welding nozzles wholly from a carbon-based materials, the one comprising providing rings made of a carbon-based material with a screw thread and joining the same to metallic nozzle bodies, and the one comprising mechanically caulking parts made of a carbon-based material with metallic nozzle bodies. However, each method has its drawbacks; for instance, because of the fragility of carbon-based materials, damage may readily occur during use, or screwed or caulked portions may readily get loose during use, resulting in the portions falling off.

DISCLOSURE OF THE INVENTION

It is an object of the invention, which has been made in view of such problems as mentioned above, to provide novel composites made of a carbon-based material and a metallic material to thereby solve the heat resistance and thermal fatigue resistance problems mentioned above.

Another object of the invention is to provide welding nozzles having a novel structure and having very excellent resistance to spatter adhesion.

To accomplish the above objects, the present inventors made intensive investigations and, as a result, found that when a carbon-based material is joined to a metallic material by means of a brazing filler metal having a particular composition, composites having excellent heat resistance and thermal fatigue resistance can be obtained. It was also found that welding nozzles obtained by brazing a ring made of a carbon-based material to the tip of a metallic nozzle for welding using said brazing filler metal are resistant to spatter adhesion and have a firm bonding between the metallic and carbon-based materials, by which the carbon-based material is prevented from being damaged or becoming loose and falling off during use.

Thus, the invention provides the following composites comprising a carbon-based material and a metallic material and the following welding nozzles.

1. Composites made from a carbon-based material and a metallic material by joining them together by means of a brazing filler metal which is an alloy comprising, as essential components thereof, at least one element selected from the group consisting of vanadium, niobium, titanium, zirconium and silicon and at least one element selected from the group consisting of copper, silver, nickel and aluminum.

2. Welding nozzles comprising a metallic nozzle and a ring made of a carbon-based material as attached to the tip of said metallic nozzle by means of a brazing filler metal which is an alloy comprising, as essential components thereof, at least one element selected from the group consisting of vanadium, niobium, titanium, zirconium and silicon and at least one element selected from the group consisting of copper, silver, nickel and aluminum.

The carbon-based material to be used in the composites of the present invention include, among others, carbon materials, such as carbonaceous materials, graphite and graphitic materials, carbon-metal composites, and carbon-ceramic composites. As the carbon-metal composites, there may be mentioned, for example, the so-called infiltrated composite materials produced by impregnating porous sintered carbon with a metal, such as copper, silver or silicone, in a molten state to thereby fill the pores of said porous carbon with said metal, and materials produced by sintering carbon-metal powder mixtures. As the carbon-ceramic composites, there may be mentioned, for instance, composite materials prepared by integrally sintering a mixture of a carbon powder as a sintering material and a ceramic material such as silicon carbide, silicon nitride, boron nitride or aluminum nitride.

As the metallic material to be used in the composites of the invention, there may be mentioned, among others, copper, copper alloys, iron, iron alloys, aluminum and aluminum alloys. Copper is preferably tough pitch copper, oxygen-free copper or phosphorus deoxygenated copper, for instance. Preferred copper alloys are alloys of copper with tin, zinc, nickel, iron and/or the like. Iron is preferably pure iron. Preferred iron alloys are alloys of iron with carbon, niobium, titanium, vanadium, tungsten, molybdenum, chromium, manganese, nickel, silicon, boron and/or the like. Aluminum is preferably aluminum metal and preferred aluminum alloys are alloys of aluminum with manganese, silicon, magnesium, copper, zinc and/or the like elements.

The brazing filler metal to be used in the composites of this invention is an alloy comprising, as essential components thereof, at least one element selected from among vanadium, niobium, titanium, zirconium and silicon and at least one element selected from among copper, silver, nickel and aluminum. It is possible to incorporate in this brazing filler metal one or more additive elements such as tin, indium, phosphorus, boron, manganese and chromium in an amount of up to about 15% by weight to thereby adjust the melting point of the alloy or improve the strength, corrosion resistance, oxidation resistance and/or some other characteristic of the alloy. Among these components, tin, indium and phosphorus should preferably be used each in an amount not more than 10% by weight and boron, manganese and chromium should preferably be used each in an amount not exceeding 5% by weight.

A preferred composition of the brazing filler metal to be used in accordance with the invention is as follows: 0.5-10% by weight, more preferably 3-8% by weight, of at least one element selected from among vanadium, niobium, titanium, zirconium and silicon and 99.5-90%, more preferably 97-94% by weight, of at least one element selected from among copper, silver, nickel and aluminum, based on the combined amount of these elements.

In the practice of the invention, the brazing filler metal having a composition such as mentioned above may be used in an appropriate foil, sheet or powder paste form, for instance, like the conventional brazing filler metals. In the practice of the invention, it is also possible to use not only the above-mentioned alloy filler metal but a mixture containing the desired components and capable of forming the alloy having the above-mentioned composition when heated and melted to form a brazing filler metal layer, as the brazing filler metal. The brazing filler metal is not limited in thickness but, when used in the form of a foil, it should preferably have a thickness of about 10-100 μm. When it is used in the form of a powder paste, it is preferable that the brazing filler metal layer after brazing should preferably have a thickness of about 10-50 μm.

The composites of the invention can be produced by sandwiching the above brazing filler metal between a carbon-based material to form an assembly and a metallic material, fixing the assembly by means of a fixing device so as to prevent relative displacement between both the materials, and heating the assembly under vacuum (about $10^{-4}$ to $10^{-5}$ torr) or in such an atmosphere as argon or hydrogen at about 800°-1,000° C. for about 5 to 15 minutes.

The composites of the invention as obtained by the above method have excellent heat resistance and thermal fatigue resistance and hardly allow the joint portion thereof to be damaged or peel off.

The heat resistance and thermal fatigue resistance of the composites of the present invention can be still improved by inserting in the joint portion a material (interlayer material) having a coefficient of linear expansion which is intermediate between those of the carbon-based and metallic materials. The material having such intermediate coefficient of linear expansion is preferably a carbon-metal composite, for example a material derived from carbon by impregnation with copper, aluminum or the like, or a material obtained by sintering a carbon-copper mixture. Particularly preferred as the metal-impregnated carbon material is one obtained by impregnation with the same metal as the joining partner metal itself or the same metal as the main component metal of the joining partner. Other materials usable as the interlayer material are low expansion metals, such as molybdenum, tungsten, Kovar and 42 nickel alloy, cermets, such as tungsten carbide-cobalt and titanium carbide-nickel cermets, low expansion ceramics, such as silicon carbide and silicon nitride, and sintered copper-silicon nitride mixtures, among others.

The interlayer need not consist of a single material. Thus, a material prepared from two or more materials differing in coefficient of linear expansion by joining them together by diffusion bonding, brazing or soldering, or the like method can also be used as the interlayer material. When the interlayer is made of a single material, the material should preferably be closer in coefficient of linear expansion to the carbon-based material than to the metallic material. Thus, for example, since the coefficient of linear expansion of carbon is about $2 \times 10^{-6}$ to $5 \times 10^6$/° C. tungsten molybdenum, silicon carbide, silicon nitride, carbon-metal composites and carbon-ceramic composites, having a coefficient of linear expansion of about $3 \times 10^{-6}$ to $6 \times 10^{-6}$/° C., are recommended as interlayer materials. When the interlayer is prepared from two or more materials by joining them together, the material facing the carbon-based material should preferably have a coefficient of linear expansion of about $3 \times 10^{-6}$ to $6 \times 10^{-6}$/° C. while the material facing the metallic material should preferably have a coefficient of linear expansion greater than that of the material facing the carbon-based material but smaller than that of the metallic material so that the coefficient of linear expansion can vary stepwise from the carbon-based material side to the metallic material side.

For forming composites using such interlayer, the interlayer is sandwiched between the carbon-based and metallic materials, with a brazing filler metal having the above-mentioned composition being inserted between the interlayer and carbon-based material and between the interlayer and metallic material, and the resulting carbon-interlayer-metal assembly is immobilized using a fixing device for preventing relative displacement of the materials to be joined together and then heated under vacuum (about $10^{-4}$ to $10^{-5}$ torr) or in an argon, hydrogen or like atmosphere at about 800°-1,000° C. for about 5-15 minutes. The thickness of the interlayer is not critical but generally is about 5 μm to about 1 mm.

In the following, mention is made of welding nozzles as an example of the use of the composites mentioned above.

The welding nozzles according to the invention are prepared by joining a ring made of a carbon-based material to the tip of a metal nozzle using the brazing filler metal mentioned above.

As in the case mentioned above, the metal nozzle may be made of copper, a copper alloy, iron, an iron alloy, aluminum or an aluminum alloy, for instance. The shape of the metal nozzle is not critical but may be any of various shapes. The structure of the metal nozzle is not critical, either. Thus, the nozzle may be made of a continuous single pipe, or made of two halves of a pipe as joined together by screwing or some other appropriate means. The invention is applicable to these and other structures.

The carbon-based material to be attached to the tip of the metal nozzle may be a carbonaceous material, graphite or a graphitic material, a carbon-metal composite or a carbon-ceramic composite, for instance. Particularly in the case of welding nozzles requiring large welding current, carbon-metal composites are preferably used to reduce the thermal stress that otherwise may lead to damaging of the carbon-based material ring. The carbon-based material may have almost the same diameter and wall thickness as those of the metal nozzle tip. It may have a length of about 10 to 30 mm.

The brazing filler metal may have the same composition as mentioned above. For large welding current welding nozzles, however, silver-, copper- or nickel-based brazing filler metals are preferably used.

The welding nozzles of the invention can be manufactured in the same manner as in the manufacture of the composites of the invention mentioned above.

As in the case of the above-mentioned composites, insertion of a material intermediate in coefficient of linear expansion between the metal nozzle and carbon-based material into the joining portion can improve the heat resistance and thermal fatigue resistance. This is particularly effective as a means for thermal stress reduction in welding nozzles operated with large welding current. Any of the above-mentioned materials intermediate in coefficient of linear expansion may be used for this purpose as well.

As mentioned above, the composites of the invention have excellent heat resistance and thermal fatigue resistance and can be obtained in an economically advantageous manner. The composites of the invention can be used very suitably in or as containers for molten metals or parts for melting metals, or welding members to be used in environments where spatter and/or the like is scattered. They have heat resistance and thermal fatigue resistance sufficient to endure these conditions of use, without undergoing damage in the joint portion or falling off.

The welding nozzles of the invention are scarcely susceptible to spatter adhesion since the tip portion thereof that is most susceptible to concentrated spatter adhesion is made of a carbon-based material. Even if a slight amount of spatter had adhered thereto, the combustibility of the carbon-base material can readily cause self-dropping of the spatter. Thus, the decrease of efficiency due to spatter adhesion in the prior art can be much avoided. In addition, the bonding between the carbon-based and metallic materials is firm and strong, hence the carbon-based material can hardly be damaged or get loosened and fall off. As a result, much labor for periodic nozzle cleaning and exchange can be saved. Continuous monitoring for the state of spatter adhesion to nozzles as required in the prior art is now unnecessary. The nozzles exhibit very good operability and can readily realize fully automated or robotized welding.

EXAMPLES

The following examples are further illustrative of the present invention.

EXAMPLE 1

An isotropic carbon ring (20 mm in outside diameter, 10 mm in length and 1 mm in wall thickness) was used as the carbon-based material and a steel ring identical in size and shape with the carbon ring mentioned above as the metallic material. Both rings were joined together by brazing in the following manner.

A Monel metal-titan alloy foil (65 Ni-30 Cu-5 Ti, 100 $\mu$m thick) was used as the brazing filler metal. This was punched to the shape of the joint portion and sandwiched between the carbon ring and steel ring, and the assembly was heated under vacuum ($1 \times 10^{-5}$ torr) at 980° C. for 10 minutes.

The thus-obtained carbon-steel composite showed no cracks in the joint portion thereof. The composite was further heated in an electric oven to 450° C., maintained at that temperature for 10 minutes and then allowed to release heat into the atmosphere. This thermal cycle (ordinary temperature-450° C. heating-cooling) was repeated 10,000 times (10,000 cycles). In this thermal cycle testing, no cracks were found at all in the joint portion.

In a destruction test, the composite was allowed to fall from a position 1 m high onto a concrete floor, with the longitudinal direction thereof parallel to the floor, whereupon destruction began from the carbon side but the joint was not destructed.

EXAMPLE 2

The tip portion of a mild steel-made welding nozzle was cut off to a length of 15 mm and a welding nozzle was manufactured by joining a carbon ring (21.5 mm in outside diameter, 14 mm in length and 2.5 mm in thickness) to the remainder of the mild steel nozzle in the following manner.

Then, an interlayer material (carbon-silicon composite), 21.5 mm in outside diameter, 16.5 mm in inside diameter and 1 mm in thickness, was sandwiched between the nozzle and carbon ring, with a 100-micron-thick brazing filler metal foil having the composition Ag-25 Cu-5 Ti being inserted between the nozzle and interlayer and between the interlayer and carbon ring. Brazing was then effected by maintaining the assembly at 850° C. for 10 minutes under vacuum ($5 \times 10^{-5}$ torr) to give a welding nozzle.

Using the thus-obtained nozzle, test MIG welding was performed under the following conditions.

| Technique | Automatic argon gas welding |
|---|---|
| Welding current | 400 A |
| Arc voltage | 46 V |
| Rate of welding | 450 mm/minute |
| Wire | 1.6 mm in diameter |
| Gas flow rate | 25 liters/minute. |

Fillet welding in flat position was repeated under the above conditions, with 10 seconds of arc generation plus 1 second of rest being taken as a cycle. After every cumulative arc time of 5 minutes, the nozzle was detached from the torch and then again attached thereto by means of screws, followed by further repeated welding.

COMPARATIVE EXAMPLE 1

A cylindrical body made exclusively of graphite with a porosity of 16% and a thermal conductivity of 0.19 calorie/cm·sec·° C. was terminally provided with an outside screw and connected with a metal nozzle (with an inside screw) and the resultant assembly was tested for welding performance under the same conditions as use in Example 2.

COMPARATIVE EXAMPLE 2

A nozzle was prepared by joining the same graphite cylinder as used in Comparative Example 1 with a copper-made metal cylinder (screwed) in the manner of shrink fitting by inserting the former into the latter hot, following by cooling. This nozzle was tested for welding performance under the same conditions as used in Example 2.

The cumulative arc times and states of joints as measured or found in Example 2, Comparative Example 1 and Comparative Example 2 are shown below in Table 1.

TABLE 1

| Nozzle of | Cumulative arc time | State of screwed portion | State of graphite-copper junction | State of mild steel nozzle-carbon Junction |
|---|---|---|---|---|
| Example 2 | 1680 min | — | — | No abnormalities |
| Comparative Example 1 | 240 min | Cracking, partial breakage | — | — |
| Comparative Example 2 | 400 min | — | Loosened fit and slipping down | — |

We claim:

1. A welding nozzle which comprises a metal nozzle and a ring made of a carbon-based material as attached to the tip of said metal nozzle by means of a brazing filler metal which is an alloy comprising, as essential components thereof, at least one element selected from the group consisting of vanadium, niobium, titanium, zirconium and silicon and at least one element selected from the group consisting of copper, silver, nickel and aluminum.

2. A welding nozzle as claimed in claim 1, wherein the carbon-based material ring is attached to the tip of the metal nozzle with a material interposed between said metal nozzle and said carbon-based material ring, said material having a coefficient of linear expansion between that of the carbon-based materials of the ring and of the metal of then nozzle.

3. A welding nozzle as claimed in claim 2, wherein the material intermediate in coefficient of linear expansion between the metal nozzle and carbon-based material is a carbon-metal composite material.

* * * * *